April 25, 1967
L. L. LARSON
3,315,312
TIRE RETREADING EQUIPMENT
Filed June 15, 1965
2 Sheets-Sheet 1
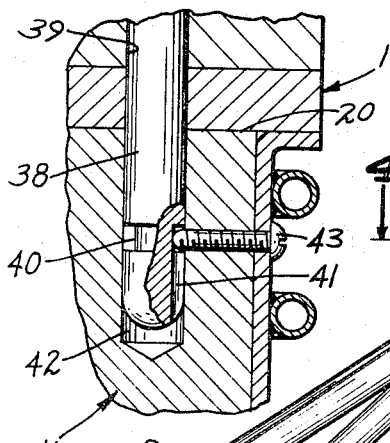
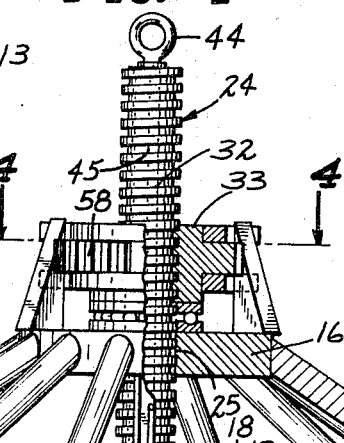
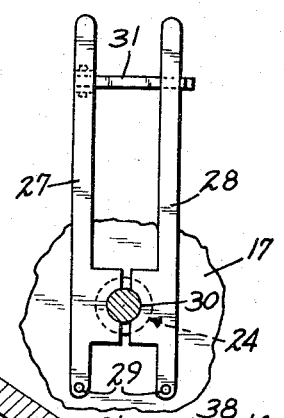
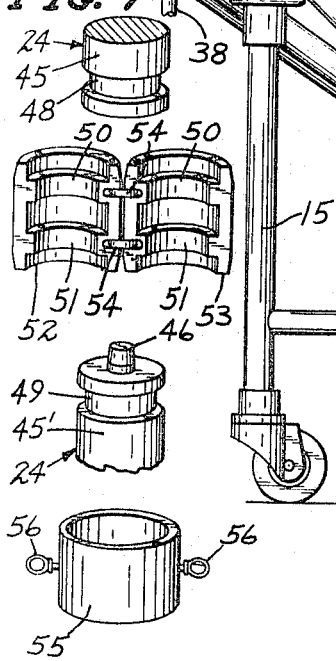
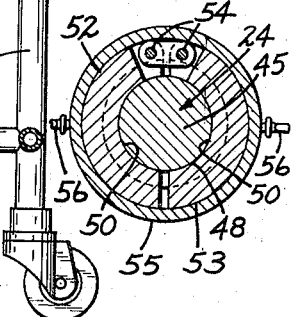
INVENTOR.
*LESTER L. LARSON*
BY
*Merchant, Merchant & Gould*
ATTORNEYS

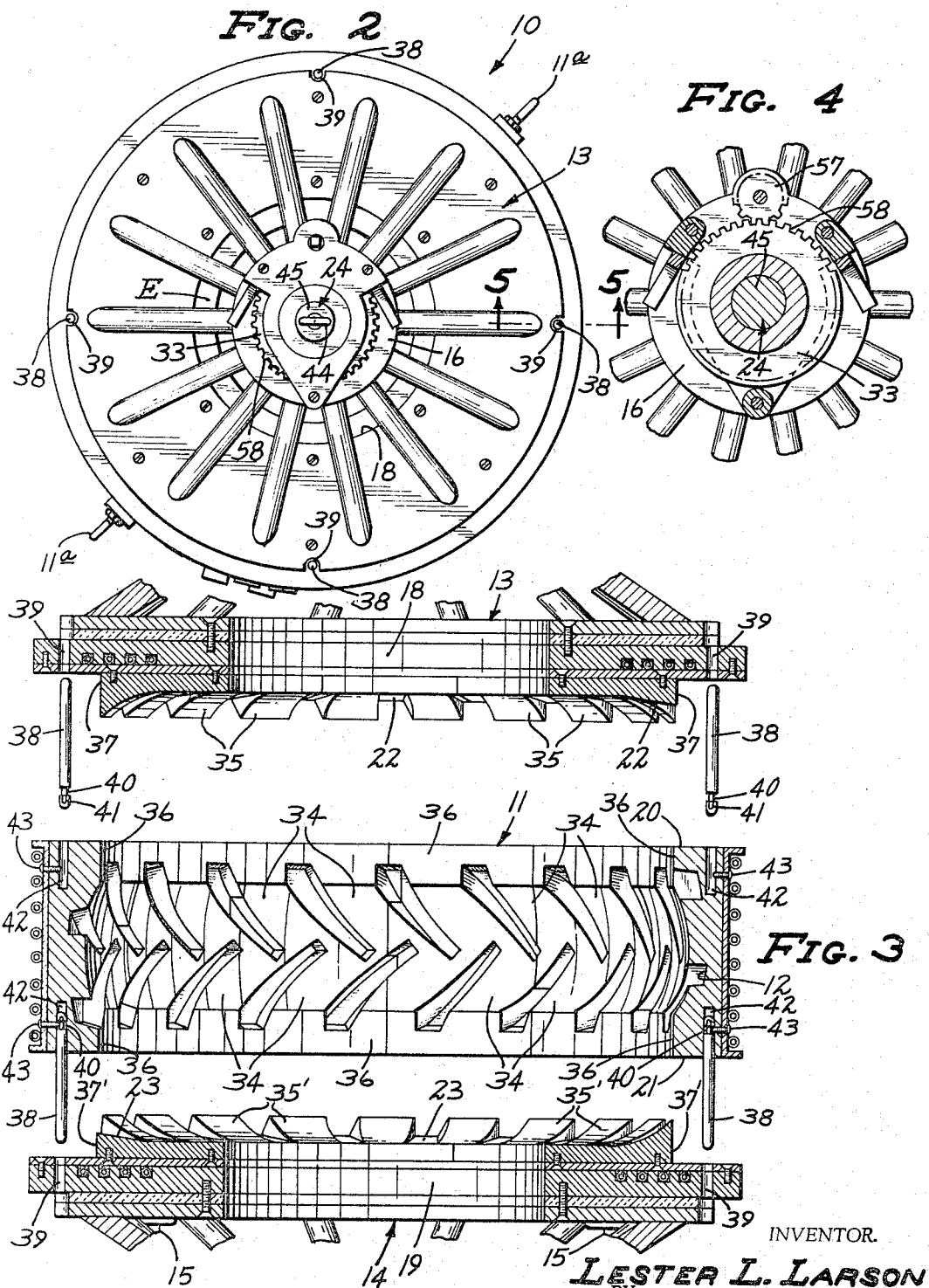

ns united states patent office 3,315,312
Patented Apr. 25, 1967

3,315,312
TIRE RETREADING EQUIPMENT
Lester L. Larson, Minneapolis, Minn., assignor to Paul E. Hawkinson Company, Minneapolis, Minn., a corporation of Minnesota
Filed June 15, 1965, Ser. No. 464,075
5 Claims. (Cl. 18—18)

My invention relates generally to tire retreading equipment and more particularly to heavy duty equipment of the type disclosed in Patent No. 2,777,163 for retreading large off-the-road tires such as those which are used on earthmovers and the like and which require a retread of the "full cap" type having a tread design which extends from the crown of a tire carcass to a point on the sidewalls thereof.

In such retreading equipment, the molds are comprised of an annular matrix and axially disposed pressure plates each of which are provided with tread design groove forming lugs. During the molding process the lugs of the matrix must be accurately aligned with the cooperating lugs on each of the pressure plates and maintained in such alignment to form a uniform tread design; also, in such heavy duty equipment it is necessary to guide the parts thereof into their molding positions without bumping or jamming of the parts against each other causing damage thereto.

It is therefore, a primary object of my invention to provide means for accurately positioning the annular pressure plates and annular matrix in axial alignment with the tread design groove forming lugs of one in mating alignment with the groove forming lugs of the other during assembly and to maintain such aligned arrangement during the molding process.

It is a further object to provide a matrix having a plurality of axially extended, circumferentially spaced apertures for the reception of one each, one of a plurality of removable pins for alignment of said matrix with respect to said pressure plates.

It is a still further object of my invention to provide axially spaced cylindrical surfaces on said matrix and cooperating cylindrical surfaces on each of said pressure plates to positively prevent axial misalignment of same during the molding process.

It is a further object of my invention to provide a device of the class above-described which is easily assembled and disassembled in the molding operation with but a minimum of time and effort.

The above and still further object of my invention will become apparent from the following detailed specification, appended claims, and attached drawings.

Referring to the drawings wherein like characters indicate like parts throughout the several views:
FIG. 1 is a view partially in side elevation and partially in axial section, portions thereof broken away and shown in section.
FIG. 2 is a view in top plan on a reduced scale;
FIG. 3 is a partially exploded view in axial section of the matrix and axially disposed pressure plates with the tire carcass removed therefrom; portions thereof broken away and shown in section.
FIG. 4 is a horizontal section taken on the line 4—4 of FIG. 1;
FIG. 5 is an enlarged detailed sectional view as seen from the line 5—5 of FIG. 2;
FIG. 6 is a horizontal section as seen from the line 6—6 of FIG. 1;
FIG. 7 is an exploded view in perspective of the coupling of the clamping screw of FIG. 1; and
FIG. 8 is a horizontal sectional view as seen from the line 8—8 of FIG. 1.
Referring with greater particularity to the several views in the attached drawings the numeral 10 indicates in its entirety a tire retreading apparatus such as is used particularly in the retreading of earthmover tires and the like. Tire retreading apparatus 10 includes an annular matrix section 11 which has a radially inwardly facing surface 12 that is engageable with the crown or tread portion $b$ of a tire casing A. Prior to insertion of the casing A into the matrix 11, the beads C of casing A are spread in a conventional manner to reduce the outer dimension of casing A. After casing A has been inserted into the matrix 11, a tube D is placed thereinto and a conventional type curing rim E is mounted in the central opening thereof to restrain the beads C of casing A against separation upon pressurization of tube D.

A pair of opposed upper and lower pressure plates 13 and 14, respectively, are provided, the latter thereof being equipped with legs 15 to support same. Pressure plates 13, 14, as shown, include head portions 16, 17, which are co-axially and outwardly positioned with respect to central openings 18, 19, in the plates 13, 14. For the purpose of clamping the pressure plates 13, 14, against opposite side edges 20, 21, of matrix 11 with the concave casing engaging faces 22, 23 thereof in engagement with the radial outer portion of the side walls $f$ of casing A, for reasons which will become apparent hereinafter, I provide the elongated screw 24. As shown screw 24 projects through central openings 18, 19, in pressure plates 13, 14, and through axial openings 25, 26, in head portions 16, 17, and is provided with means detachable mounting the lower end thereof for major adjustments of screw 24. Such adjustments depending on axial dimensions of the matrix 11 and tire casing A. Such means is shown as being in the nature of a pair of clamping arms 27, 28, pivotally mounted on lower head 17 as at 29 for swinging movements of the intermediate portion thereof toward and away from engagement with a selected one of a plurality of annular grooves 30 in the lower end of screw 24. A latch member 31 extends between the outer ends of arms 27, 28, to securely lock the intermediate portion of same within such groove 30, thus preventing axial movement of screw 24. The upper end of screw 24 is provided with screw threads 32 which have threaded engagement with a nut 33. Rotation of nut 33 imparts clamping pressure on head 16 through the medium of a thrust washer 34 to draw the plates 13, 14, into engagement with side edges 20, 21, of matrix 11 or release same from such clamping pressure as will be explained in further detail in a description of the operation of apparatus 10.

Referring specifically to FIG. 3, it will be seen that tread design groove forming rib elements 34 are formed on the inwardly facing surface 12 of matrix 11 and cooperating tread design groove forming rib elements 35, 35', are formed on each of the concave casing engaging faces 22, 23, of pressure plates 13, 14, respectively. Thus when such ribs 34, 35, 35', are in the operative position of FIG. 1, they cooperate to form conventional lugs $g$ which extend fro ma point midway on the crown $b$ of casing A to a point generally midway between the crown $b$ and bead $c$. It will be noted that the surface 12 and faces 22, 23, collectively form a deep well cavity and engage the tire casing in the area being retreaded. Thus proper pressure is exerted in said area to prevent a porous cure of the retarding material.

To positively assure accurate axial alignment of the matrix 11 with respect to the pressure plates 13, 14, I provide a pair of axially spaced, cylindrical surface portions 36 on the matrix 11 and a cylindrical surface portion 37, 37', on each pressure plate 13, 14. Cylindrical surface portions 36 on the matrix 11 are nestingly engageable with an adjacent cylindrical surface portion 37, 37', of pressure plates 13, 14, when same are in engagement with the side edges 20, 21, of matrix 11. For the purpose of guiding the pressure plates 13, 14, and the cylindrical surfaces 37, 37', of each thereof into nesting engagement with their respective cylindrical surfaces 36 of matrix 11 and to properly align the ribs 34, 35, 35', of matrix 11 and pressure plates 13, 14, respectively. I provide a plurality of circumferentially spaced pins 38 carried by the matrix 11, the outer end of one each of which is receivable in one of a plurality of apertures 39 formed in the pressure plates 13, 14. The other end of the pins 38 are each formed with an annular groove 40 and a keyway 41 which extends between the groove 40 and adjacent end of its respective pin 38. Formed in the side edge portions 20, 21, of matrix 11 are a plurality of apertures 42, one each for one of the pins 38. Apertures 42 each are provided with a key 43 in the nature of a bolt which projects radially into its respective aperture 42 a sufficient distance to permit passage of the key 43 through the keyway 41 when a pin 38 is inserted in its respective aperture 42 and reception of said key 41 in its respective groove 40 when the pin is fully received in its respective aperture 42 and rotated slightly. Upon such rotation each pin 38 will be anchored in its respective aperture 42 against axial displacement.

*Operation*

When a tire casing A and rim E have been mounted in the matrix 11, a hoist not shown is attached to the brackets 44 carried by the matrix 11. Matrix 11 is then hoisted by means of a hoist, not shown but attached to brackets 11a carried by matrix 11, to a position wherein it overlies the lower pressure plate 14 and pins 38 are inserted into the lower apertures 42 and rotated a sufficient amount to lock them in place. As the matrix is lowered, the lower pins 38 are received one each in one of the apertures 39 in pressure plate 14. Upon further lowering of matrix 11, pins 38 guide the cylindrical surface 36 into a position where it is in nesting engagement with the cylindrical surface 37' of pressure plate 14, thus axially aligning matrix 11 with plate 14. At the same time pins 38 position matrix 11 with respect to plate 14 in such a manner that the groove forming ribs 34 of the former are properly aligned with the groove forming ribs 35' of the latter. When matrix 11 is in position and supported by plate 14 and legs 15, pins 38 are inserted one each in one of the apertures 42 of side 20 of matrix 11 and locked therein as above described. Thereafter, pressure plate 13 is hoisted, by means of a hoist (not shown), but attached to the ring 44 carried by screw 24, into a position overlying matrix 11. It will be here noted that due to the size of the type tire being retreaded the mold apparatus 10 must be of a corresponding large size. In order that such apparatus may be used in building having only a minimum of ceiling clearance the screw 24 is coupled at a point intermediate the opposite ends thereof to provide the upper and lower shank portions 45, 45', respectively. Thus as the upper plate 13 is moved into position overlying matrix 11 it need be raised only a minimum amount to provide for clearance of the upper shank portion 45 with respect to matrix 11. As the upper plate 13 is lowered and pins 38 are received in the aperture 38 therein, it also is correctly axially aligned to permit nesting engagement of the cylindrical surface 36 of matrix 11 and cylindrical surface 37 of plate 13. Likewise the ribs 35 of plate 13 are also aligned with ribs 34 of matrix 11.

During final lowering movements of the upper plate 13 and upper shank portion 45 of screw 24, an axially disposed pin 46 carried by shank portion 45' of screw 24 is received in a cooperating recess 47 defined by the adjacent end of shank portion 45 thus axially aligning portions 45, 45'. For the purpose of detachably coupling portions 45, 45', and to permit clamping pressure to be exerted between plates 13, 14, the adjacent ends of the shank portions are provided with circumferentially extended channels 48, 49, which receive axially spaced inwardly projecting upper and lower lugs 50, 51, mating ones of which are carried by the semi-cylindrical sleeve elements 52, 53.

As shown sleeve elements 52, 53, are hinged as at 54 to correctly align mating lugs 50, 51, and to permit easy reception of the lugs 50, 51, in their respective channel 48, 49. A locking sleeve 55, which has been placed over shank portion 45' prior to lowering of plate 13, is then moved to a position wherein it encompasses the semi-cylindrical sleeve elements 52, 53, and the set screws 56 are tightened to securely lock same in place. Thereafter clamping pressure may be exerted between the plates 13, 14, and against matrix 11 by rotation of nut 33 through the medium of a suitable power operated rotary tool such as an air impact tool, not shown, but which operates to impart rotation to a gear 57 the teeth of which have meshing engagement gear teeth 58 formed on the nut 33. After the retreading molding operation has been completed the teh above procedure is reversed with the matrix and tire casing therein being placed in a position to remove the rim E and tube D. It will be noted at this time that since the pins 38 have been removed that the matrix may be placed on a supporting surface in engagement with either of the side edge portions 20, 21, without fear of damage to the pins 38. Also during subsequent operations wherein the tire A is removed from the matrix 11 or during repair work on same such may be effected without hindrance from the axially extending pins 38.

In view of the above it will be seen that a mold apparatus has been provided which will assure a retread on tires, of the character described, in which the lugs thereof are correctly formed and which can be moved during assembly and disassembly in the molding operation without damage to the various parts thereof.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

What is claimed is:

1. In a device the class described a combination comprising:
  (a) an annular matrix section having an inwardly facing surface engageable with the crown portion of a tire casing; said matrix also having a cylindrical surface extending outwardly from each side of said crown portion;
  (b) an annular curing rim engageable with the bead portions of a tire casing being cured in the matrix section and restraining the bead portions against separation;
  (c) a pair of opposed annular one-piece pressure plates having concave casing engaging faces adapted to engage the side wall portions of a tire casing and engageable with the opposite side edges of the matrix section to form therewith a deep cavity retread mold;
  (d) said pressure plates having axially aligned openings and each plate having a head portion thereon extending axially outwardly therefrom;
  (e) an elongated screw extending through each of said head portions and the central openings on said pressure plates;
  (f) means detachably mounting one end of said screw in one head portion for major adjustments thereof;
  (g) means associated with the other end of said screw and the other head portion for applying clamping pressure to said pressure plates;
  (h) cooperating tread design groove forming rib elements carried by the inwardly facing surface of said matrix and the concave casing engaging faces of each of said pressure plates; and, said rib elements on said concave faces projecting from opposing faces of said plates;
  (i) said rib elements on said concave faces of said plates being telescoped and rotatably received within said cylindrical surfaces outwardly of said matrix;
  (j) means for aligning the rib elements of said pressure plates with cooperating rib elements of said matrix and maintaining said matrix in concentric relationship with respect to said annular pressure plates; said means comprising:

(1) a plurality of circumferentially spaced pin and cooperating recess connections directly between said matrix and each of said pressure plates.

2. The structure defined in claim 1 in which one end of each of said pins is removably received in a different one of a plurality of apertures defined by axially spaced edge portions of said matrix and in which said one end portion of each pin defines a circumferentially extended groove and an axially extended keyway between said groove and the adjacent end of the pin, and keys projecting radially into said apertures and receivable in said keyways when said pins are inserted into said apertures and in said grooves upon rotation of said pins.

3. The structure of claim 1 wherein said screw includes axially aligned shank sections, and in further combination with means for detachably coupling adjacent ends of said shank sections.

4. The structure of claim 3 in which adjacent end portions of each of said shank sections define a circumferentially extended channel and in which said coupling means includes:

(a) a pair of semi-cylindrical sleeve elements each having mating axially spaced, inwardly projecting lugs one each receivable in one of said channels,
(b) a cylindrical locking sleeve element having encompassing relationship with said semi-cylindrical sleeve element, and
(c) means associated with at least one of said elements for maintaining said relationship.

5. The structure of claim 4 in which adjacent ends of shank portions are provided with an axially extending pin and cooperating recess connection for centering same.

References Cited by the Examiner

UNITED STATES PATENTS

| 2,235,292 | 3/1941 | Glynn | 18—18 |
| 2,327,639 | 8/1943 | Heintz | 18—18 |
| 2,422,788 | 6/1947 | Kraft | 18—18 |
| 2,743,481 | 5/1956 | Hawkinson | 18—18 |
| 2,996,760 | 8/1961 | Dennis et al. | 18—18 |
| 3,057,011 | 10/1962 | Knox | 18—44 X |

J. SPENCER OVERHOLSER, *Primary Examiner.*

J. HOWARD FLINT, JR., *Examiner.*